US007014876B2

(12) United States Patent
Iwasaki et al.

(10) Patent No.: US 7,014,876 B2
(45) Date of Patent: Mar. 21, 2006

(54) PACKAGED BEVERAGE

(75) Inventors: Masaki Iwasaki, Tokyo (JP); Kouichi Naitoh, Tokyo (JP); Susumu Ohishi, Tokyo (JP); Yoshikazu Ogura, Tokyo (JP)

(73) Assignee: Kao Corporation, Tokyo (JP)

( * ) Notice: Subject to any disclaimer, the term of this patent is extended or adjusted under 35 U.S.C. 154(b) by 66 days.

(21) Appl. No.: 10/256,081

(22) Filed: Sep. 27, 2002

(65) Prior Publication Data

US 2003/0082273 A1 May 1, 2003

(30) Foreign Application Priority Data

Sep. 28, 2001 (JP) .............................. 2001-304429
Aug. 8, 2002 (JP) .............................. 2002-231815

(51) Int. Cl.
*A23F 3/00* (2006.01)
(52) U.S. Cl. .......................... 426/77; 426/106; 426/597
(58) Field of Classification Search ................ 426/590, 426/592, 597, 77, 106
See application file for complete search history.

(56) References Cited

U.S. PATENT DOCUMENTS

| 4,906,480 | A | * | 3/1990 | Kashket ........................... 426/3 |
| 5,464,619 | A | | 11/1995 | Kuznicki et al. |
| 5,952,023 | A | | 9/1999 | Lehmberg et al. |
| 6,063,428 | A | * | 5/2000 | Ekanayake et al. .......... 426/597 |
| 6,632,462 | B1 | * | 10/2003 | Blair et al. ..................... 426/49 |

FOREIGN PATENT DOCUMENTS

| EP | 0 426 230 | | 5/1991 |
| JP | 60-156614 | | 8/1985 |
| JP | 63-277628 | | 11/1988 |
| JP | 1-44234 | | 9/1989 |
| JP | 2-276562 | | 11/1990 |
| JP | 3-133928 | | 6/1991 |
| JP | 3-164136 | | 7/1991 |
| JP | 11-246402 | | 9/1991 |
| JP | 4-253918 | | 9/1992 |
| JP | 4-352726 | | 12/1992 |
| JP | 6-311875 | | 8/1994 |
| JP | 11-116418 | | 4/1999 |
| JP | 3403400 | | 6/2003 |
| WO | WO 97/30597 | | 8/1997 |
| WO | WO 200015049 | A1 * | 3/2000 |
| WO | WO 02/39822 | | 5/2002 |
| WO | WO 02/065846 | | 8/2002 |

OTHER PUBLICATIONS

Increase in Antibacterial Activity of Green Tea Infusion by Heat Treatment, 2000, translated.*
Kagaku to Seibutsu, vol. 38, No. 2, pp. 104-114, "Biodynamics Of Natural Antioxidants In Humans", 2000 (with partial English translation).
Bulletin of the Tea Experiment, No. 3, pp. 41-46, "Researches on the Preparation of Instant Tea", (with partial English translation).
Notice of Opposition to the Grant of Patent: Notice of Opposition(ITO EN, LTD.): Opposition No. 2003-71208; Patent No. 3342698; May 12, 2003 English translation provided.
Notice of Opposition to the Grant of Patent; Notice of Opposition(ITO EN, LTD.); Opposition No. 2003-70843; Patent No. 3329799; Mar. 31, 2003 English translation provided.
Notice of Opposition to the Grant of Patent; Notice of Opposition(Kiichiro Yoshikawa); Opposition No. 2003-72082(01); Patent No. 3378577; Aug. 13, 2003 English translation provided.
Notice of Opposition to the Grant of Patent; Notice of Opposition(ITO EN, LTD.); Opposition No. 2003-72082 (02); Patent No. 3378577; Aug. 18, 2003 English translation provided.
Notice of Opposition to the Grant of Patent: Filed Nov. 6, 2003, Notice of Opposition (ITO EN, LTD.): Opposition No. 2003-72696; Japanese Patent No. 3403400; Jun. 17, 2003 English translation provided.
Exhibit 1—Journal of the Japanese Society for Food Science and Technology, Masahi Asaka, et al., Tokyo Institute of Food Technology, Hyogo, Japan, An Increase in Antibacterial Activity of Green Tea Infusion by Heat-Treatment, Title Page and Index Page with pp. 708-715, Japanese Language, 2000.
Exhibit 2—Report of Trial Production Test, 5pp. Japanese Language, 2000.
Exhibit 3—Beverage Japan, No. 188 (vol. 20, No. 8), Aug. 1997, Title Page; Index Page, p. 14 and un-numbered last page, Japanese Language.
Exhibit 4—Report of Trial Production Test, 5 pp., Japanese Language.
Exhibit 5—The Soft Drinks Technology, 1993, Title Page with pp. 88-102, Japanese Language.
Exhibit 6—See *AP*—Page 1 of this Form *Foreign Patent Documents* section, Japanese Patent 11-116418.

(Continued)

*Primary Examiner*—Drew Becker
(74) *Attorney, Agent, or Firm*—Oblon, Spivak, McClelland, Maier & Neustadt, P.C.

(57) ABSTRACT

Provided is a packaged beverage comprising the following ingredients (A) and (B):
(A) non-polymer catechins in an amount of from 0.092 to 0.5 g/100 mL beverage,
(B) an alcoholic precipitate in an amount of 0.015 g/100 mL beverage or less in terms of the amount of magnesium, at a weight ratio (A)/(B) ranging from 30/1 to 50000/1. The packaged beverage of the present invention is the best suited beverage for health promotion, because drinking of it permits transfer of a large amount of catechins to the blood form the beverage and their absorption in the body is excellent.

18 Claims, 1 Drawing Sheet

OTHER PUBLICATIONS

Exhibit 7—Asaka, Masashi "Screening of Antibacterial Substances in Heated Green Tea Beverage", Abstracts of Research Reports at the 37thConselors' Meeting of Toyo Food Research Foundation (held on Oct. 9, 1998, pp. 23-30 and its Certificate).

Exhibit 8—See *AQ*—Page 1 of this Form *Foreign Patent Documents* section, Japanese Patent 3-164136.

Exhibit 9—Report of Human Test, 5pp., Japanese Language.

Exhibit 10—*AR*,—Page 1 of this Form *Foreign Patent Documents* section, Japanese Patent 11-246402.

Exhibit 11—Nikkei Health, 10-11 (Oct., 2000) 2pp., Japanese Language.

Exhibit 12—Nippon Shokuhin Kogyo Gakkaishi vol.38, No. 3, 189-195 (1991), Platelet Aggregation Inhibitory Activity of Tea Extracts, Kazuko Namiki et al, *School of Home Economics, Sugiyama Jogakuen University, Nagoya, Japan*, pp. 189-195, Japanese Language.

Exhibit 13—*AS*,—Page 1 of this Form *Foreign Patent Documents* section, Japanese Patent 6-311875.

Exhibit 14—Journal of the Japanese Society for Food Science and TechnologyAn Increase in Antibacterial Activity of Green Tea Infusion by Heat-Treatment, *Toyo Institute of Food Technology, Hyogo*, Japan, An Increase in Antibacterial Activity of Green Tea Infusion by Heat-Treatment, Masahi Asaka, et al., Title page with pp. 708-715, Japanese Language.

Exhibit 15—"New Encyclopedia of Tea Business" compiled by the The Chamber of Tea Association of Shizuoka Pref., (Oct. 1, 1988), pp. 476-477, Japanese Language.

Exhibit 16—Biodynamics of Natural Antioxidants in Humans, vol. 38, No. 2, 2000, Teruo Miyazawa, et al., Title Page with pp. 104-140, Japanese Language.

* cited by examiner

PACKAGED BEVERAGE

BACKGROUND OF THE INVENTION

1. Field of the Invention

The present invention relates to a packaged beverage having a high concentration of catechins.

2. Related Art

Now, the market of foods containing tea leaves as a raw material such as canned beverages and instant drinks is massive. It is reported that catechins contained in tea drinks such as green tea, black tea and Oolong tea have physiological usefulness such as cholesterol-level-rise suppressive action (Japanese Patent Laid-Open No. 156614/1985), α-amylase activity inhibitory action (Japanese Patent Laid-Open No. 133928/1991), blood-sugar-level-rise inhibitory action (Japanese Patent Laid-Open No. 253918/1992), arteriosclerosis preventive action (Japanese Patent Laid-Open No. 352726/1992), antioxidative action (Japanese Patent Publication No. 44234/1989), antibacterial action (Japanese Patent Laid-Open No. 276562/1990), blood-pressure-rise suppressive action and enzymatic activity inhibitory action (Japanese Patent Laid-Open No. 133928/1991), antitumor action (Japanese Patent Laid-Open No. 277628/1988) and mutation suppressive action.

In order to allow catechins to exhibit their physiological action more effectively, an increase in the intake amount of catechins is necessary. For this purpose, a beverage form facilitating intake of a large amount of catechins is desired from the viewpoint of preference and marketability. Intake of a large amount of catechins is however accompanied with such drawbacks that bitterness or astringency peculiar to them becomes an obstacle to it, they tend to impart the resulting beverage with a turbid appearance, they cause a marked change in color tone after long-term storage in the package, and a deterioration in taste upon retorting is negligible. These drawbacks damage the commodity value of the beverage. With these problems in view, improvement and investigation are under way.

If the beverage contains an increased amount of catechins, more effective absorption of them in the body will not only increase their utilizing degree but also contribute to the health promotion. It is known ("Kagaku to Seibutsu, 38, 2, 104–114(2000)") that with regards to absorption in the body, that is, pathway for the transfer of catechins to the blood, a very small portion of catechins is absorbed from the digestive tract; some of the thus absorbed catechins are subjected to conjugation reaction in the mucoepithelial cells, transported to the liver through portal veins, and conjugated further; with some in the conjugated form and some in the free form, the catechins enter in the blood stream, and transferred to the peripheral tissue; and with some in the form contained in a bile secreted from the liver, the catechins are injected into the duodenum and after enterohepatic circulation, transferred to the kidney and then at last, secreted into urea.

With health-oriented trend and prevalence of PET beverages in recent years, the consumption amount of green tea is on increase among young people. Development of a beverage permitting positive use of physiologically active catechins in the body is desirable from the viewpoint of health enhancement.

SUMMARY OF THE INVENTION

An object of the present invention is therefore to provide a healthy drink capable of maximizing the transfer amount of catechins to the blood upon drinking, thereby heightening the utilization degree of them in the body.

The present inventors have found that in a packaged beverage having a high concentration of catechins, by controlling the amount of an alcoholic precipitate bonded to magnesium to not greater than a predetermined amount, an amount of the catechins transferred to the blood upon drinking can be increased markedly.

In the present invention, there is thus provided a packaged beverage comprising, in the dissolved form, the following ingredients (A) and (B):

(A) non-polymer catechins 0.092 to 0.5 g/100 mL of the beverage, (B) an alcoholic precipitate not greater than 0.015 g/100 mL of the beverage in terms of the amount of magnesium at a weight ratio (A)/(B) of from 30/1 to 50000/1.

Since the packaged beverage according to the present invention features a high transfer amount of catechins to the blood and excellent absorption in the body upon drinking, it is best suited for health enhancement.

DETAILED DESCRIPTION OF THE INVENTION

Figure 1:
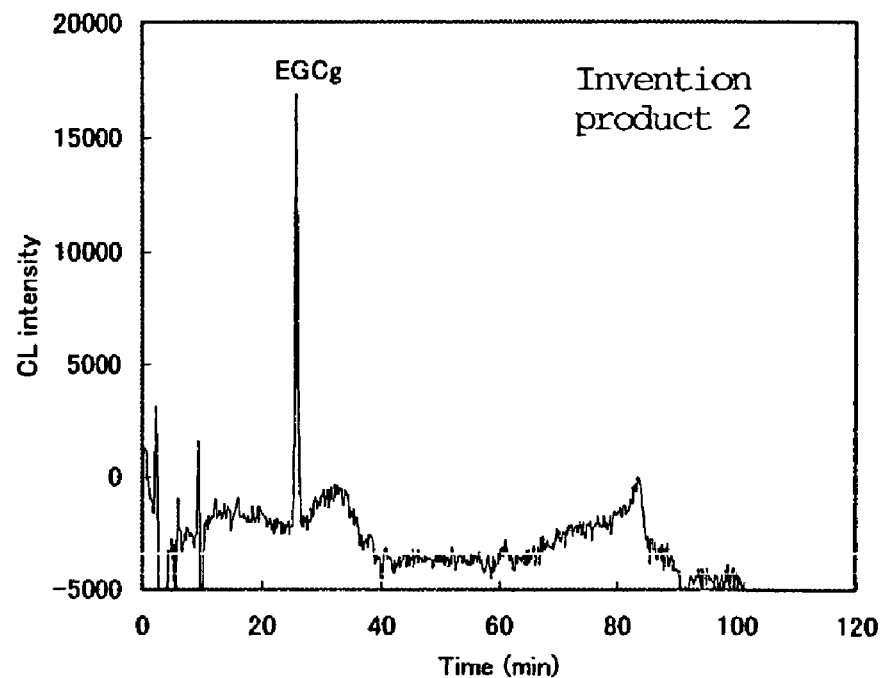
FIG. 1 is a chart showing the epigallocatechin gallate plasma level upon drinking of Invention product 2.

The term "catechins" as used herein means a generic name of non-epi-catechins such as catechin, gallocatechin, catechin gallate and gallocatechin gallate and epi-catechins such as epicatechin, epigallocatechin, epicatechin gallate and epigallocatechin gallate.

The catechins to be used in the present invention may be available by extracting, with water or hot water, green tea such as medium green tea, coarse green tea, refined green tea, Tencha (not powdered green tea) or Kamairi-cha (tea roasted in an iron kettle instead of steamed therein) manufactured from species belonging to *Camellia* spp. such as *C. sinensis* or *C. assaimica*, or hybrid thereof; semi-fermented tea generically called "Oolong tea", such as Ti Kuan Yin, Se-zhong, Huanjingui or Wuyi Rock Tea; or fermented tea called black tea, such as Darjeeling, Assam or Sri Lanka.

Tea is extracted by the conventional method such as stirring. To water upon extraction, an organic acid or organic acid salt such as sodium ascorbate may be added in advance. A method of extracting in a non-oxidizing atmosphere while removing dissolved oxygen by boiling for deaeration or feeding of an inert gas such as nitrogen gas may be used in combination.

Instead of extraction from tea leaves, a concentrated tea extract may be dissolved in water or an extract from tea leaves and the concentrated tea extract may be used in combination. The term "concentrated tea extract" as used herein means the concentrate of an extract obtained by extracting tea leaves with hot water or a water soluble organic solvent in accordance with the process as described in detail in Japanese Patent Application Laid-Open No. 219384/1984, 20589/1992, 260907/1993 or 306279/1993. Examples of the concentrate include commercially available ones such as "Polyphenon" of Tokyo Food Techno Co., Ltd., "Thea-furan" of Itoen, Ltd., "Sunphenon" of Taiyo Kagaku Co., Ltd. and "Sun-oolong" of Suntory Limited. In addition, catechins available from the other raw materials, columnpurified products and chemically synthesized products can be used. The "concentrated tea extract" in the present invention can be used in various forms such as solid, aqueous solution and slurry. Examples of a liquid to dissolve therein a tea extract include water, carbonated water and tea containing a small amount of catechins.

Some of catechins are non-polymers dissolved in a tea extract, while others are in the solid form adsorbed to or encapsulated by fine tea powder. Ingredient (A) to be used in the present invention is non-polymer catechins obtained by filtering a tea extract or the like, drying the filtrate and then dissolving the dried filtrate in water. Catechins not in the dissolved form are not readily absorbed in the body so that those in the dissolved form are preferred.

Ingredient (A) is incorporated in the dissolved form in an amount of from 0.092 to 0.5 g, preferably from 0.1 to 0.5 g, especially from 0.1 to 0.4 g, per 100 mL of the packaged beverage. At such an amount, the resulting beverage can exhibit sufficient physiological activity.

When at least 45 wt. %, more preferably 46 to 98 wt. % of the non-polymer catechins as the ingredient (A) is composed of epicatechin gallate, gallocatechin gallate, epigallocatechin gallate and/or catechin gallate, the transfer amount of catechins to the blood increases, and enhances utilization degree of them in the body. As a result, the resulting beverage becomes more desirable as a healthy beverage promoting absorption of the physiologically effective catechins in the body. The beverage of the present invention contains at least one of epigallocatechin gallate, gallocatechin gallate, epicatechin gallate and catechin gallate, but it usually contains them all. The total content (wt. %) of epigallocatechin gallate, gallocatechin gallate, epicatechin gallate and catechin gallate in the ingredient (A) is called "gallate ratio".

The alcoholic precipitate, which serves as the ingredient (B) in the present invention, is a precipitate which appears when an alcohol is added to the beverage. It is known that addition of an alcohol to a tea extract causes a corresponding amount of white precipitate. This precipitate is presumed to be a carbohydrate composed mainly of pectin, but details are not known (Bulletin of the National Institute of Tea Science, No. 3, p. 42). It is however not investigated whether or not the content of an alcoholic precipitate, which is presumed to be a carbohydrate, to bond to magnesium has an influence on the transfer amount of catechins to the blood.

In the present invention, it has been found that the transfer amount of catechins to the blood can be raised by reducing the amount of the alcoholic precipitate bonded to magnesium. The amount of the alcoholic precipitate can be expressed by the amount of magnesium, in terms of the amount per 100 mL of a beverage, which appears when magnesium chloride and an alcohol (particularly, isopropanol) are successively added to the beverage. This means that since there exists no definition of respective chemical substances constituting the alcohol precipitate, the mass of the alcoholic precipitate of the present invention can be determined by the amount of magnesium bonded thereto. Described specifically, the amount of magnesium bonded to an alcoholic precipitate can be determined by adding magnesium chloride to a beverage, filtering off the alcoholic precipitate, measuring the magnesium amount in the residue, and deducting the magnesium amount after filtration from that before filtration. This becomes a determination index of the alcoholic precipitate contained in the beverage. The alcoholic precipitate of the present invention can be controlled not to exceed a predetermined content in a manner known per se in the art such as purification and enzymatic treatment.

The content of Ingredient (B) is, in terms of magnesium, 0.015 g or less, preferably 0.012 g or less, more preferably 0.010 g or less, still more preferably from 0.00001 to 0.009 g or less, especially from 0.00001 to 0.007 g, per 100 mL of the packaged beverage. When the content of Ingredient (B) is controlled within this range, the resulting beverage becomes more desirable as a healthy beverage, because the transfer amount of catechins to the blood increases upon drinking of the beverage, presumably enhancing utilization degree of catechins in the blood.

The weight ratio of the ingredient (A) to (B) in the packaged beverage of the present invention, that is, (A)/(B) ranges from 30/1 to 50000/1, preferably from 40/1 to 50000/1, more preferably from 50/1 to 20000/1, still more preferably from 60/1 to 20000/1, especially from 70/1 to 20000/1. At a weight ratio (A)/(B) within the above-described range, the resulting beverage becomes more desirable as a healthy beverage, because the transfer amount of catechins to the blood increases upon drinking of the beverage.

Addition of polymer catechins to the packaged beverage of the present invention is preferred, because they accelerate physiological activity. Polymer catechins have a structure in which a plurality of catechins have been linked each other by a tea-derived enzyme, oxygen or light. More specifically, they mean polyphenols which are popularly called theaflavin and thearubigin. Polymer catechins are preferably incorporated in an amount of 0.002 mg or greater, more preferably 0.01 mg or greater, especially from 0.1 to 2000 mg, per 100 mL of the packaged beverage of the present invention.

The packaged beverage of the present invention preferably contains polyphenols such as gallic acid, ethyl gallate, propyl gallate from the viewpoint of enhancing physiological activity. Among them, gallic acid is most suited because it has water solubility. Gallic acid is preferably added in an amount of 0.01 mg or greater, more preferably 0.05 mg or greater, especially 0.1 mg or greater per 100 mL of the packaged beverage of the present invention.

In the packaged beverage of the present invention, a plant extract such as fruit extract and vegetable extract can be incorporated as a flavoring substance in order to satisfy various preferences of consumers irrespective of age and sex. Examples of the plant extract include fruit extracts available from apples, oranges, lemons, limes, grapefruits, strawberries, cherries, pineapples, loquats, grapes and figs, nuts, and extracts of a part of a plant other than fruits such as barks, roots and leaves. Examples include coffee bean extract, fermented tea extract, semi-fermented tea extract, and unfermented tea extract. These extracts may be either those available from natural sources or those available by synthesis.

When an unfermented tea extract is added, its amount is controlled to 70 wt. % or less, especially 60 wt. % or less based on the total amount of catechins in the packaged beverage. When a semi-fermented tea extract is added, its amount is controlled to 50 wt. % or less, more preferably 30 wt. % of less, especially 20 wt. % or less based on the total amount of catechins in the packaged beverage. In the case of a fermented tea extract, its amount is controlled to 25 wt. % of less, more preferably 20 wt. % or less, especially 15 wt. % or less based on the total amount of catechins in the packaged beverage. These tea extract added as a flavoring substance contain non-polymer catechins so that the amount of the non-polymer catechins in such an additive is also calculated as the content of Ingredient (A).

The vegetable extract may be an extract available from a portion of a vegetable such as cabbage, lettuce, tomato, Japanese radish, broccoli, carrot, pumpkin and spinach. Either the vegetable extract available from natural sources or that by synthesis is usable.

The content of the vegetable extract in the packaged beverage of the present invention is 10 wt. % or less, preferably 5 wt. % or less, more preferably 2 wt. % or less, especially from 0.001 to 0.2 wt. % or less, in terms of a soluble solid content, per 100 mL of the packaged beverage.

The packaged beverage of the present invention is preferably adjusted to have a pH, at 25° C., of from 2 to 7, more preferably from 3 to 7, especially from 4 to 7 from the viewpoint of taste and chemical stability of catechins.

The packaged beverage of the present invention may contain an additive necessary for its preparation and not impairing the tea-derived ingredient. Examples include antioxidants, perfumes, various esters, organic acids, organic acid salts, inorganic acids, inorganic acid salts, inorganic salts, colorants, emulsions, preservatives, seasonings, sweeteners, bitterness masking agents, acidulants, nectar extracts, pH regulators and quality stabilizers. They may be used either singly or in combination.

For example, sweeteners include sugar, glucose, fructose, isomerized liquid sugar, glycyrrhizin, stevia, aspartame, sucralose, fructo-oligosaccharide and galacto-oligosaccharide. The sweetener is preferably added to the packaged beverage of the present invention in an amount of from 0.0001 to 0.5 wt. %, more preferably from 0.0001 to 0.4 wt. %.

As the bitterness masking agent, cyclic dextrins typified by cyclodextrins can be used. Examples include α-, β-, γ-, branched α-, branched β- and branched γ-cyclodextrins. The bitterness masking agent is preferably added to the packaged beverage of the present invention in an amount of from 0.01 to 1 wt. %, more preferably from 0.05 to 0.9 wt. %.

Examples of the acidulant include, as well as juices extracted from natural substances, citric acid, tartaric acid, malic acid, lactic acid, fumaric acid and phosphoric acid. The acidulant is preferably added to the packaged beverage or the present invention in an amount of from 0.0001 to 0.5 wt. %, more preferably from 0.0001 to 0.4 wt. %.

Examples of the inorganic acids or salts thereof include phosphoric acid, disodium phosphate, sodium metaphosphate and sodium polyphosphate, while those of the organic acids or salts thereof include citric acid, succinic acid, itaconic acid, malic acid and sodium citrate. They are each preferably added to the packaged beverage of the present invention in an amount of from 0.0001 to 1 wt. %, more preferably from 0.001 to 0.7 wt. %.

As a container to be used for the packaged beverage, ordinarily employed ones such as molded containers (so-called PET bottles) composed mainly of polyethylene terephthalate, metal cans, paper containers lined with a metal foil or plastic film and bottles can be used as usual. Here, the packaged beverage means a beverage which can be drunk without dilution.

The packaged beverage of the present invention is prepared, for example, by filling a container such as metal can with the beverage; and then if possible, sterilizing it under conditions as specified by Food Sanitation Law. When the container is not suited for retort sterilization, for example, PET bottle or paper container, employed is a method of sterilizing the beverage under similar conditions to the above-described ones, for example, at high temperature for short time by a plate type heat exchanger, cooling it to a predetermined temperature and then, filling it in the container. Alternatively, under sterile conditions, another ingredient may be filled in a container having the beverage already filled therein. Or, it is possible to sterilize by heating under acidic conditions, followed by converting the pH to neutral again under sterile conditions; or to sterilize by heating under neutral conditions, followed by converting the pH to acidic again under sterile conditions.

EXAMPLES

Measurement of Catechins in a Beverage

A catechin content of a packaged beverage, which had finished filtration through a filter (0.8 μm) and dilution with distilled water, was measured by high-performance liquid chromatograph ("SCL-10AVP"; product of Shimadzu Corporation) equipped with "L-Column TM ODS" (packed column for octadecyl-introduced liquid chromatograph, 4.6 mmØ×250 mm: product of Chemicals Evaluation and Research Institute, Japan) at a column temperature of 35° C. by a gradient method. Measurement was conducted under the following conditions: use of a distilled water solution containing 0.1 mol/L of acetic acid as a mobile phase solution A and an acetonitrile solution containing 0.1 mol/L of acetic acid as a mobile phase solution B, an amount of sample injected: 20 μL, and a wavelength of UV detector at 280 nm.

Measurement of the Mass of an Alcoholic Precipitate in a Beverage

A packaged beverage was opened after shaking it well. The beverage was then adjusted to about pH 6 with a pH regulator. A 0.1 mol/L aqueous solution of magnesium chloride was added in an amount of 1 g relative to 100 g of the beverage, followed by thorough mixing (Solution C). A 1 g portion of the resulting mixture was added dropwise to 50 g of isopropanol while stirring well. The precipitate thus formed was filtered off by a membrane filter (pore size: 0.8 μm). The amount of magnesium in the filtrate was analyzed by flame atomic absorption spectrometry and it was converted to the magnesium concentration in 100 mL of the beverage. On the other hand, the amount of magnesium in Solution C was analyzed as was by flame atomic absorption spectrometry and it was converted to the magnesium concentration in 100 mL of the beverage. The mass of the alcoholic precipitate bonded to magnesium in the beverage was calculated from the difference of these magnesium concentrations. It was expressed as the magnesium amount per g/100 mL.

Measurement of Absorption into the Body (Testing Method)

Test was conducted on three healthy male volunteers from age 35 to 46. From 3 days before blood collection, alcohol intake was prohibited. During the test term, intake of food rich in tea catechins or polyphenols was restricted.

Until the lunch on the day before the testing day, the subjects took meal ad libitum, while upon supper, the subjects had to take a meal adjusted to a calorie of 840 kcal, protein of 41 g, lipid of 32 g and carbohydrate of 90 g. From 9:00 p.m. onward, intake of anything other than water was prohibited. Adopted was the crossover test in which one subject drinks both the invention product and comparative product and compared them.

The test was conducted in a room at 25° C. After conditioning for about 1 hour, about 8 ml of the blood before intake of a beverage was collected using a heparin-treated injection cylinder (10 mL capacity). The test beverage was then given to the subject over 10 minutes. One hour later, the blood was collected in a similar manner.

(Pretreatment of Test Substance and Measurement of Catechin Level in the Blood)

The whole blood of the blood thus collected was centrifuged at 3000 r/min at 4° C. for 15 minutes to obtain an upper plasma layer.

To 0.25 mL of the resulting plasma were added 0.25 mL of a phosphate buffer (obtained by dissolving 48 g of $NaH_2O_4$, 20 g of vitamin C and 1 g of EDTA-2Na thoroughly in 1 L of distilled water and then adjusting pH of the resulting mixture to 3.9 with 0.1 mol/L NaOH) and 0.5 mL of acetonitrile, followed by thorough mixing. After addition of 3 mL of ethyl acetate and mixing, the resulting mixture was centrifuged at 3000 r/min at 4° C. for 15 minutes to obtain an upper ethyl acetate layer. The above-described extracting operation was repeated three times. The ethyl acetate layers thus obtained were collected, dried on a rotary evaporator and then dissolved in 0.9 mL of a 1:8 water-methanol mixture. The resulting solution was provided for HPLC chromatodisk. After filtration with 4.0 mL of methanol, the filtrate was dried over the rotary evaporator again. The catechin extract thus obtained (dried portion) was dissolved in 0.3 mL of a 9:1 water-acetonitrile mixture. A 0.1 mL portion of the resulting solution was provided for Chemiluminescence Analyzer (ultraweak light detector; product of Tohoku Electric Industrial Co., Ltd.) and the amount of epigallocatechin gallate (EGCg), a typical ingredient of catechins, in the plasma was measured. The catechin concentration was expressed by the amount (ng/mL) of epigallocatechin gallate per mL of plasma.

Analysis Conditions by Chemiluminescence Analyzer

HPLC column: L-column (product of Chemicals Evaluation and Research Institute, Japan) 4.6 mm×250 mm.

Mobile phase: a 10 vol. % aqueous acetonitrile solution containing 0.1% phosphoric acid, flow rate: 1.0 mL/min.

Light emitting reagent 1: a 8.0 mol/L acetaldehyde solution (prepared by adding 500 mL of acetaldehyde to a 50 mmol/L phosphate buffer containing 100 mg of horseradish peroxidase to give the total amount of 1 L), flow rate: 3.0 mL/min Light emitting reagent 2: a hydrogen peroxide solution (30%), flow rate: 1.0 mL/min Light detector: "CLD-110LH" (product of Tohoku Electronic Industrial Co., Ltd.)

Example 1

Preparation Process of each Concentrated Tea Extract

Concentrated Tea Extract A:

By 7.5 L of hot water, 500 g of green tea leaves of medium grade were treated and then, the leaves were filtered off. The extract thus obtained was treated with chloroform for decaffeination, followed by treatment with ethyl acetate to distribute catechins in the ethyl acetate layer. From the ethyl acetate layer, the organic solvent was distilled off. The residue was dissolved in water. The resulting solution was lyophilized into dry powder (concentrated tea extract A).

Concentrated Tea Extract B:

With 45 L of hot water, 1500 g of green tea leaves of medium grade were extracted, followed by removal of the tea leaves by filtration. From the filtrate, a portion of water was distilled off to obtain a tea concentrate. After the resulting tea concentrate was caused to pass through a chromatographic column filled with an adsorbent ("DIAION-HP2MG", trade name; product of Mitsubishi Chemical Corporation), caffeine was washed off by water. Then, catechins were eluted using a 70% aqueous ethanol solution. The eluate thus obtained was concentrated under reduced pressure (1).

In a similar manner to that employed in (1), 500 g of green tea leaves of medium grade were treated with 7.5 L of hot water to extract catechins from the tea leaves (2).

After mixing (1) and (2) to give a mixing ratio of 1.85:1.0 in terms of solid concentration, the resulting mixture was lyophilized, whereby a concentrated tea extract B was obtained.

Concentrated Tea Extract C:

By 7.5 L of hot water, 500 g of green tea leaves of medium grade were treated and then, the leaves were filtered off. The extract thus obtained was treated with chloroform for decaffeination, followed by treatment with ethyl acetate to distribute catechins in the ethyl acetate layer. From the ethyl acetate layer, the organic solvent was distilled off. The residue was dissolved in water. (3)

In a similar manner to that employed for (3), 500 g of green tea leaves of medium grade were treated with 7.5 L of hot water to extract catechins from the tea leaves (4).

After mixing (3) and (4) to give a mixing ratio of 0.67:1.0 in terms of solid concentration, the resulting mixture was lyophilized, whereby a concentrated tea extract C was obtained.

Concentrated Tea Extract D:

With 20 L of hot water, 500 g of tea leaves were treated to extract catechins therefrom. The extract thus obtained was lyophilized, whereby concentrated tea extract D was obtained.

Ingredients as shown in Table 1 were mixed, followed by a predetermined treatment. The resulting mixture was then filled in a package, whereby a packaged beverage was prepared.

TABLE 1

|  | Invention products | | | | | | Comparative products | g |
|---|---|---|---|---|---|---|---|---|
|  | 1 | 2 | 3 | 4 | 5 | 6 | 1 | 2 |
| Flavoring substance | | | | | | | | |
| Grape fruits extract *1 | 100 | | | | | | | |
| Oolong tea extract *2 | | 240 | | | | | 240 | 240 |
| Commercially available caffeineless coffee *3 | | | 18 | | | | | |
| Coffee bean extract *4 | | | | | 50 | | | |
| Black tea extract *5 | | | | 160 | | | | |
| Green tea extract *6 | | | | | | 160 | | |
| Concentrated tea extract *7 A | 3.4 | | 7.4 | | | | | |
| Concentrated tea extract *7 B | | 2.6 | | | 2.5 | 1.8 | | 0.27 |

TABLE 1-continued

|  | Invention products | | | | | | Comparative products | |
| --- | --- | --- | --- | --- | --- | --- | --- | --- |
|  | 1 | 2 | 3 | 4 | 5 | 6 | 1 | 2 |
| Concentrated tea extract *7 C |  |  |  | 4.3 |  |  |  |  |
| Concentrated tea extract *7 D |  |  |  |  |  |  | 8.8 |  |
| Sweetener | 0.3 | 0.1 | 0.25 |  | 0.2 | 0.2 | 0.1 |  |
| Cyclic dextrin |  | 0.02 |  | 4.5 |  | 0.01 | 0.02 |  |
| Sodium ascorbate | 0.3 | 0.3 | 0.3 | 0.3 | 0.3 | 0.3 | 0.3 | 0.3 |
| Commercially available water *10 | Balance | Balance | Balance | Balance | Balance | Balance | Balance | Balance |
| Total weight | 1000 | 1000 | 1000 | 1000 | 1000 | 1000 | 1000 | 1000 |
| pH *8 | 3.3 | 6.2 | 6.3 | 6.4 | 5.9 | 6.2 | 6.1 | 6.3 |
| Post-treatment (heating) | | | | | | | | |
| Temperature (° C.) | 65 | 139 | 123 | 123 | 138 | 139 | 139 | 139 |
| Time (min) | 10 | *9 | 25 | 25 | *9 | *9 | *9 | *9 |
| Non-polymeric catechin content in the beverage (g/100 mL) | 0.28 | 0.20 | 0.42 | 0.21 | 0.19 | 0.19 | 0.20 | 0.03 |
| Gallate ratio | 58 | 50 | 61 | 47 | 52 | 56 | 46 | 51 |
| Weight of alcoholic precipitate (g/100 mL) in terms of magnesium | 0.006 | 0.002 | 0.012 | 0.0031 | 0.0025 | 0.002 | 0.008 | 0.0009 |
| (A)/(B) | 47 | 100 | 35 | 68 | 76 | 95 | 25 | 33 |
| EGCg concentration detected in plasma (ng/1 mL) | 230 | 220 | 260 | 160 | 190 | 205 | 100 | 20 |
| Appearance of beverage | Clear | Clear | Slightly clear | Slightly clear | Clear | Clear | Clear | Clear |

Figure 2:
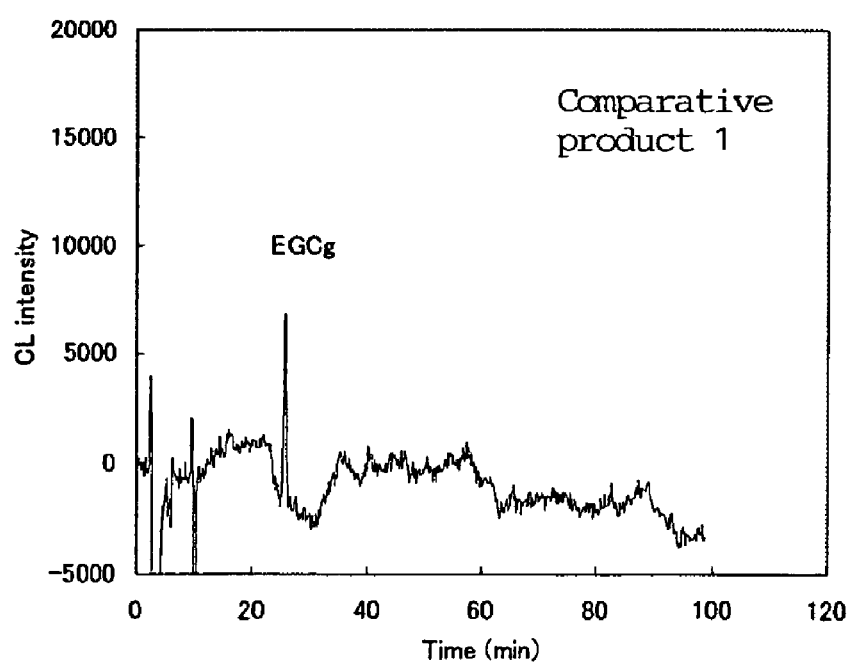
FIG. 2 is a chart showing the epigallocatechin gallate plasma level upon drinking of Comparative product 1.

*1 A juice obtained by squeezing 1 kg of grapefruits by a squeezer was concentrated and then filtered through a filter cloth made of a cotton flannel. Soluble solid content: 10%
*2 Oolong tea leaves (33 g) were added to 1 kg of deionized water which had been kept at 85° C. and the mixture was extracted for 8 minutes. Then, the extract was filtered through a filter cloth made of a cotton flannel while cooling by a heat exchanger. Soluble solid content: 0.8%.
*3 Commercially available Caffeineless coffee (trade name; product of Nestle Japan, Ltd.), soluble solid content: 95% or greater
*4 Hot water of 95° C. was poured into 200 g of coffee beans. The coffee extract (1000 g) was collected and then, filtered through a cloth filter made of cotton flannel while cooling by a heat exchanger. Soluble solid content: 3.5%.
*5 Black tea leaves (50 g) were added to 1 kg of deionized water kept at 85° C. and extraction was performed for 10 minutes. The extract was then filtered through a cloth filter made of cotton flannel while cooling by a heat exchanger. Soluble solid content: 1%.
*6 To 1 kg of deionized water kept at 90° C., 100 g of green tea leaves were added. Extraction was performed for 8 minutes. The extract was then filtered through a cloth filter made of cotton flannel while cooling by a heat exchanger. Soluble solid content: 1.2 wt. %.
*7 Concentrated tea extract
A: catechin content: 82 wt. %, food fiber: not detected, theanine: not detected, polymer catechin content: 0.8 wt. %, gallic acid content: 0.3 wt. %
B: catechin content: 73 wt. %, food fiber: not detected, theanine content: 0.46 wt. %, polymer catechin content: 0.7 wt. %, gallic acid content: 0.4 wt. %
C: catechin content: 51 wt. %, food fiber content (pectin, etc., which will equally apply hereinafter): 1.5 wt. %, theanine content: 0.6 wt. %, polymer catechin content: 0.5 wt. %, gallic acid content: 0.4 wt. %
D: catechin content: 20 wt. %, food fiber content: 3.5 wt. %, theanine content: 0.8 wt. %, polymer catechin content: 0.3 wt. %, gallic acid content: 0.5 wt. %
*8 PH of Invention Product 1 was adjusted with citric acid, while that of each of Invention products 2 to 6 and Comparative products 1 and 2 was adjusted with sodium bicarbonate.
*9 10 seconds (deaeration line prior to sterilizing step)
*10 Commercially available water Indication: calcium content: 7.1 mg/100 mL, magnesium content: 2.4 mg/100 mL, sodium content: 4.7 mg/100 mL Results of analysis of catechins in 100 mL of each of the packaged beverages of Invention products 1 to 6 and Comparative products 1 and 2 and measurement results of absorption in the body are shown in Table 1, while measurement results of epigallocatechin gallate (EGCg) in the plasma of Invention product 2 and Comparative Product 1 are shown in FIG. 1 and FIG. 2, respectively.

Compared with Comparative Products 1 and 2, Invention products 1 to 6 each showed an increase in the amount of epigallocatechin gallate detected from the plasma, suggesting enhancement of catechin absorption in the body.

What is claimed is:

1. A packaged beverage comprising the following ingredients (A) and (B):
   (A) non-polymer catechins in an amount of from 0.092 to 0.5 g/100 mL beverage,
   (B) an alcoholic precipitate in an amount of 0.015 g/100 mL beverage or less in terms of the amount of magnesium, at a weight ratio (A)/(B) ranging from 50/1 to 20000/1.

2. A packaged beverage of claim 1, wherein the alcoholic precipitate appears when an alcohol is added to the beverage.

3. A packaged beverage of claim 1 or 2, wherein the amount of the alcoholic precipitate is the amount of magnesium in the precipitate which appears when isopropanol is added to the beverage to which magnesium chloride has been added.

4. A packaged beverage of any one of claim 1 or 2, further comprising polymer catechins in an amount of 0.002 mg/100 mL beverage or greater.

5. A packaged beverage of any one of claim 1 or 2, further comprising 0.01 mg/100 mL beverage or greater of gallic acid.

6. A packaged beverage of any one of claim 1 or 2, wherein at least 45 wt. % of the catechins are selected from the group consisting essentially of epigallocatechin gallate, gallocatechin gallate, epicatechin gallate, catechin gallate and a mixture thereof.

7. The packaged beverage of claim 1, wherein said non-polymer catechins are present in an amount of from 0.1 to 0.5 g per 100 mL of beverage.

8. The packaged beverage of claim 1, wherein said non-polymer catechins are present in an amount of from 0.1 to 0.4 g per 100 mL of beverage.

9. The packaged beverage of claim 1, wherein said alcoholic precipitate is present in an amount of from 0.012 g or less per 100 mL of beverage.

10. The packaged beverage of claim 1, wherein said alcoholic precipitate is present in an amount of from 0.010 g or less per 100 mL of beverage.

11. The packaged beverage of claim 1, wherein said alcoholic precipitate is present in an amount of from 0.00001 to 0.009 g per 100 mL of beverage.

12. The packaged beverage of claim 1, wherein said alcoholic precipitate is present in an amount of from 0.0001 to 0.007 g per 100 mL of beverage.

13. The packaged beverage of claim 1, wherein said weight ratio (A)/(B) ranges from 40/1 to 50000/1.

14. The packaged beverage of claim 1, wherein said weight ratio (A)/(B) ranges from 60/1 to 20000/1.

15. The packaged beverage of claim 1, wherein said weight ratio (A)/(B) ranges from 70/1 to 20000/1.

16. The packaged beverage of claim 1, further comprising from 0.0001 to 0.5 wt. % of a sweetener.

17. The packaged beverage of claim 1, further comprising from 0.01 to 1 wt. % of a cyclodextrin.

18. The packaged beverage of claim 1, further comprising from 0.0001 to 1 wt. % of an inorganic acid or salt thereof.

* * * * *